US009740422B1

(12) United States Patent
Ozdemir (10) Patent No.: US 9,740,422 B1
(45) Date of Patent: Aug. 22, 2017

(54) VERSION-BASED DEDUPLICATION OF INCREMENTAL FOREVER TYPE BACKUP (71) Applicant: EMC CORPORATION, Hopkinton, MA (US)

(72) Inventor: Kadir Ozdemir, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 251 days.

(21) Appl. No.: 13/829,293

(22) Filed: Mar. 14, 2013

(51) Int. Cl.
G06F 12/02 (2006.01)
G06F 3/06 (2006.01)
G06F 17/30 (2006.01)

(52) U.S. Cl.
CPC .......... G06F 3/0641 (2013.01); G06F 3/0626 (2013.01); G06F 17/30073 (2013.01)

(58) Field of Classification Search
CPC .... G06F 3/0614; G06F 3/0604; G06F 3/0608; G06F 3/0626; G06F 3/064; G06F 3/065; G06F 11/1451; G06F 11/1469; G06F 11/1464; G06F 11/1453; G06F 11/1456; G06F 11/1488; G06F 11/1461; G06F 11/1466; G06F 11/1446; G06F 11/1471; G06F 17/30; G06F 17/3007; G06F 17/30073; G06F 17/30575; G06F 2201/80; G06F 2201/84
USPC .................................. 711/155, 161; 707/646
See application file for complete search history.

(56) References Cited

U.S. PATENT DOCUMENTS 5,778,395 A * 7/1998 Whiting et al.
7,624,335 B1 * 11/2009 Maheshwari et al. ........ 714/807
7,941,459 B1 * 5/2011 Erickson ........................ 707/803
8,108,446 B1 * 1/2012 Christiaens ........... G06F 3/0608
707/693
8,117,464 B1 * 2/2012 Kogelnik ...................... 713/193
8,140,470 B2 * 3/2012 Kemmler ....................... 707/602
8,180,740 B1 * 5/2012 Stager et al. .................. 707/692
8,204,868 B1 * 6/2012 Wu et al. ....................... 707/693
8,392,384 B1 * 3/2013 Wu et al. ....................... 707/693

(Continued)

OTHER PUBLICATIONS

George Crump, "Does Deduplication Eliminate the Need for Good Backup Design?" (Jun. 9, 2011). Accessed Jan. 7, 2014 from the Internet: http://www.storage-switzerland.com/articles/Entries/2011/6/9_Does_Deduplication_Eliminate_The_Need_For_Good_Backup_Design.html.*

(Continued)

Primary Examiner — Tracy A Warren
(74) Attorney, Agent, or Firm — Blakely, Sokoloff, Taylor & Zafman LLP (57) ABSTRACT A system and method for improving deduplication techniques in a data storage system. In one embodiment, a data storage system is configured to divide first data into a first plurality of segments, to generate a first plurality of fingerprints that are each to be associated with a segment, to identify second data that is to be updated by the first data and a second plurality of fingerprints associated with the second data, to load the second data and the second plurality of fingerprints from persistent storage of the data storage system into working memory, to determine, in the working memory, that a first segment of the first plurality of segments updates the second data by comparing a first fingerprint associated with the first segment to the second plurality of fingerprints, and to overwrite a second segment of the second data with the first segment in response to the determination.

27 Claims, 4 Drawing Sheets (56) References Cited

U.S. PATENT DOCUMENTS

| | | | | |
|---|---|---|---|---|
| 8,396,839 | B1* | 3/2013 | Huang | 707/664 |
| 8,447,741 | B2* | 5/2013 | Reiter | G06F 11/1453 |
| | | | | 707/692 |
| 8,706,695 | B1* | 4/2014 | Sorenson, III | 707/649 |
| 8,898,114 | B1* | 11/2014 | Feathergill et al. | 707/648 |
| 8,904,008 | B2* | 12/2014 | Calder et al. | 709/226 |
| 8,904,125 | B1* | 12/2014 | Elling | G06F 11/1451 |
| | | | | 711/162 |
| 2003/0018878 | A1* | 1/2003 | Dorward et al. | 711/216 |
| 2008/0208929 | A1* | 8/2008 | Phillipi | 707/204 |
| 2011/0099342 | A1* | 4/2011 | Ozdemir | G06F 11/2066 |
| | | | | 711/162 |
| 2011/0231367 | A1* | 9/2011 | Niles et al. | 707/646 |
| 2012/0150949 | A1* | 6/2012 | Vijayan Retnamma et al. | 709/203 |
| 2012/0151136 | A1* | 6/2012 | Hay et al. | 711/114 |
| 2014/0181034 | A1* | 6/2014 | Harrison et al. | 707/646 |
| 2014/0279958 | A1* | 9/2014 | Huang | 707/692 |

OTHER PUBLICATIONS

"Deduplication, Incremental Forever, and the Olsen Twins" (2012). Unitrends. Columbia, SC USA. Accessed as PDF on Jan. 7, 2014 from the Internet: http://www.unitrends.com/docs/papers/white-papers/unitrends-wp-deduplication-and-the-olsen-twins.pdf.*

* cited by examiner

VERSION-BASED DEDUPLICATION OF INCREMENTAL FOREVER TYPE BACKUP

FIELD OF INVENTION

Embodiments of the present invention relate generally to data storage systems. More particularly, embodiments of the invention relate to deduplication techniques in data storage systems.

BACKGROUND

In modern computer systems, a file system stores and organizes computer files to enable a user to efficiently locate and access requested files. File systems can utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a backup file system. These backup file systems can be located local to the data to be backed up or at a remote site. The backup file systems can be managed by the entity controlling the primary data storage devices or a data storage service company. Data can be added to the storage system at any frequency and at any amount.

A data storage system can implement data deduplication techniques to improve data compression in a backup file system. Data deduplication is an approach to data compression that involves reducing the amount of duplicate data maintained within a file system. To realize this data compression, unique sections of data—e.g., byte patterns or bit patterns—are identified before being stored in the file system so that only the unique data sections are stored. A duplicate data section can be replaced with a pointer to the existing unique data section so that the duplicate data section is not stored in the file system. Accordingly, the volume of data stored or processed in a file system can be reduced.

BRIEF DESCRIPTION OF THE DRAWINGS

The embodiment of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1:
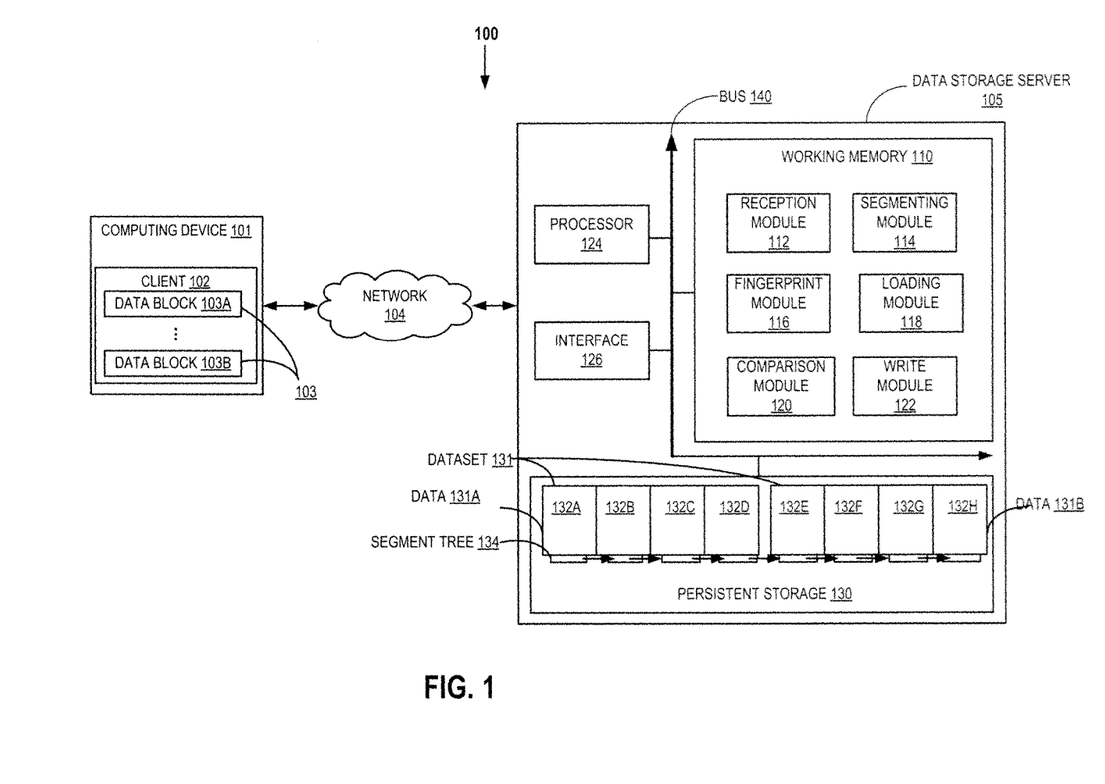
FIG. 1 is a block diagram of a data storage system according to one embodiment of the invention.

Beginning first with FIG. 1, a block diagram is shown illustrating a data storage system 100 according to one embodiment of the invention. Referring to FIG. 1, the system 100 includes, but is not limited to, a client 102 communicatively coupled with a data storage server 105 over network 104. The client 102 can be any type of client such as a server, a personal computer (e.g., a desktop, laptop, or tablet), a "thin" client, a personal digital assistant (PDA), a Web-enabled appliance, a gaming device, a media player, or a mobile phone (e.g., a Smartphone), or other system suitable to transmit data over a network 104. In some embodiments, multiple clients similar to the client 102 can be communicatively coupled with the data storage server 105 via the network 104.

The client 102 can provide primary storage of the dataset 103 for one or more devices integrated therein or communicatively coupled therewith. The dataset 103 can be stored in the client 102 in blocks, such as blocks 103A-B of the client 102. The blocks can be of any size and the sizes of blocks can be fixed or variable. For example, the blocks 103A-B of the client 102 can be approximately sixty-four (64) kilobytes. In one embodiment, the client 102 sends data over the network 104 to the data storage server 105 at a block level—that is, the client 102 sends one or more data blocks 103A-B, but does not send fractional blocks.

According to one embodiment, the client 102 implements an incremental backup scheme in combination with the data storage server 105. The incremental backup can be, for example, of an incremental-forever type, such as change block tracking. In one such embodiment, the client 102 initially sends an image of the entire dataset 103 to the data storage server 105 and, subsequently, the client 102 sends only an image of a changed data block 103A or 103B (or multiple blocks 103A-B where multiple blocks are changed). Because the client 102 sends data in blocks, an entire data block 103A-B is sent to the server 105 even where only a byte of the data block 103A-B has been modified.

In one embodiment, the client 102 can send an image of a data block 103A-B that includes metadata for identifying corresponding data 131A-B at the server 105. For example, the client 102 can include a unique identifier with an image of the data block 103A to indicate to the server 105 that the data 131A is to be updated by the image of the data block 103A that is sent by the client 102. The unique identifier can be a property of the data block 103A-B, such as a physical address or logical unit number (LUN) address of the data block 103A-B or the offset of the data block 103A-B within a backup image containing the data block 103A-B. Additionally, the client 102 can include multiple unique identifiers (e.g., multiple addresses) where the client 102 sends multiple blocks so that the correspondence with the data 131A-B stored at the server 105 is determinable. The client 102 can track the metadata in a separate file, such as a log of changed blocks.

The client 102 is communicatively coupled with the data storage server 105 via the network 104. The network 104 can be any type of network such as a local area network (LAN), a wide area network (WAN) such as the Internet, a corporate intranet, a metropolitan area network (MAN), a storage area network (SAN), a Fibre Channel (FC) network, a bus, or a combination thereof. The network 104 can be wired, wireless or a combination of the two.

The data storage server 105 can include any type of server or cluster of servers. For example, the data storage server 105 can be a storage server used for any of various different purposes, such as to provide multiple users with access to shared data and/or to back up mission-critical data. The data storage server 105 can be, for example, a file server (e.g., an appliance used to provide network-attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. The data storage server 105 can have a distributed architecture, or all of its components can be integrated into a single unit. The data storage server 105 can be implemented as part of an archive and/or backup system such as a de-duplication storage system available from EMC® Corporation of Hopkinton, Mass. Additionally, the data storage server 105 can be communicatively coupled to an auxiliary storage system similar to the data storage server 105. The auxiliary storage system can duplicate the functionality of the data storage server 105. Alternatively or in addition to the data storage server 105, the auxiliary storage system can provide some additional data warehousing or data manipulation.

In one embodiment, the data storage server 105 includes, but is not limited to, a working memory 110, a processor 124, an interface 126 and a persistent storage 130. The processor 124 is configured to execute instructions for performing operations across a number of components and can be, for example, a general-purpose processor, a central processing unit, or a plurality of processors suitable for implementation within a data storage server. The processor 124 is communicatively coupled with a plurality of components within the data storage server 105. To realize this communicative coupling, the processor 124 can communicate with the other components across a bus 140. The bus 140 can be any subsystem adapted to transfer data within the data storage server 105. The bus 140 can be a plurality of computer buses and include additional circuitry to transfer data.

It should be appreciated that embodiments of the invention as will be hereinafter described can be implemented in conjunction with the execution of instructions by the processor 124 of the server 105 and/or other circuitry of the server 105. Particularly, circuitry of the server 105, including but not limited to the processor 124, can operate under the control of a program, routine, or the execution of instructions to execute methods or processes in accordance with embodiments of the invention. For example, an operating system (not shown) can be operable to initiate the execution of the instructions provided by the modules 112-122, manage the interface 126 and perform other operations across the server 105, including threading, resource management, data storage control and other similar functionality. Further, it should be appreciated that the terms processor, microprocessor, circuitry, controller, etc., refer to any type of logic or circuitry capable of executing logic, commands, instructions, software, firmware, functionality and the like.

The interface 126 can accept data across the network 104 from the client 102 to be processed or stored in the data storage server 105. The interface 126 can be implemented in hardware, software or a combination of the two and can include, for example, components such as a network card, network access controller or a host bus adapter. The interface 126 is communicatively coupled to the working memory 110, which processes data to be stored in the data storage server 105. The working memory 110 can be volatile, such as static random access memory (SRAM) and/or dynamic random access memory (DRAM). The working memory 110 provides storage of computer readable instructions, data structures, modules, and other data for the server 105. Such data can be loaded from the persistent storage 130. The working memory 110 can also include cache memory, such as a cache located at the processor 124. In some embodiments, the working memory 110 can be distributed into several components of the server 105, including the processor 124 and the interface 126. The working memory 110 includes, but is not limited to, several modules: a reception module 112, a segmenting module 114, a fingerprint module 116, a loading module 118, a comparison module 120, and a write module 122.

Though illustrated in FIG. 1 as existing in the persistent storage 130, the dataset 131 can be received from the client 102 and processed by modules 112-122 in the working memory 110 prior to reaching the persistent storage 130. The dataset 131 includes an image of the dataset 103 received from the client 102. The reception module 112 is configured to receive this fresh data—i.e., data that has not been stored in the persistent storage 130—from the client 102 over the network 104 and, therefore, can be communicatively coupled or integrated with the interface 126. The reception module 112 can be configured to load fresh data into the working memory 110 so that the fresh data can be processed by another module 114-122. In some embodiments, the reception module 112 receives the fresh data from the client 102 as a stream and can buffer incoming data while earlier received data is processed.

According to some embodiments, the data storage system 105 can store data 131A-B that corresponds to data blocks 103A-B at the client 102—e.g., data 131A and 131B can include previously received versions of the data blocks 103A and 103B, respectively. The dataset 131 can be received from a client as part of an initialization operation where the initial data—i.e., "seed" data—is received from the client 102. The seed data can be an image of the entire dataset 103 at the client 102. Subsequently, the data storage system 105 can receive from the client 102 a data block 103A-B that corresponds to data 131A-B at the server 105 and is to update that data 131A-B.

The segmenting module 114 is configured to divide fresh data into small regions when the data is loaded into the working memory 110 by the reception module 112. The division process results in data "segments" that are fractional components of the data as a whole and can be of any size, such as eight (8) KB. The segmenting module 114 can adhere to a specific policy or algorithm for dividing the data into data segments, e.g., by breaking the data based on properties of the content in the data, which permits changes to one data segment without affecting the boundaries or contents of other data segments. The division process aims to partition fresh data into segments of an average size (e.g., 8 KB), but there can be acceptable minimum and maximum limits for the size of a segment that are less than and greater than the target segment size, respectively; for example, if the target segment size is 8 KB, then a segment of an acceptable size can be greater than 4 KB and less than 16 KB, and therefore not necessarily exactly 8 KB. However, in an alternative embodiment the data can be divided into fixed-size data segments (e.g., 8 KB blocks) instead of variable-sized data segments.

To support the identification of data segments, the segmenting module 114 can generate and maintain metadata about the segments, such as a physical or logical address or other correspondence identifier so that a correspondence between one fresh data segment and one stored data segment 132A-H is determinable. This metadata can be generated for each segment that is generated by the segmenting module 114.

Data that is stored in the persistent storage 130 is stored as data segments 132A-H. This division process and segmented storage allows portions of the dataset 131 stored in the data storage server 105 to be manipulated without disrupting the dataset 131 as a whole. The segmenting module 114 can generate a segment tree 134 for the metadata that is stored for the data segments 132A-H in the persistent storage 130. In one embodiment, the segment tree 134 is a hierarchical structure that represents a map of addresses to unique segment references (e.g., identifiers, fingerprints, segment sizes, etc.) for the segments 132A-H. The segment tree 134 can be updated by other modules 116-122. In one embodiment, the segment tree 134 is associated with only one dataset 131 for one client 102 at the data storage server 105, and therefore the data storage server 105 can include a second segment tree (not shown) associated with a second dataset (not shown) for a second client (not shown) that is communicatively coupled with the server 105 over the network 104.

The fingerprint module 116 is configured to assign a unique value, or "fingerprint," to each segment generated by the segmenting module 114. Therefore, each unique data segment is identifiably distinguishable from any other data segment by reference to the associated fingerprint. In one embodiment, this fingerprint is unique in the set of all data segments unless two data segments contain exactly the same data (i.e., there is a one-to-one correspondence between unique data segments and fingerprint values); in such an instance, two data segments with identical byte or bit patterns would have the same fingerprint. In generating a fingerprint for a data segment, the fingerprint module 118 can include a fingerprint in the metadata of an associated data segment. In one embodiment, a cryptographic hash function, such as a Secure Hash Algorithm (SHA) function (e.g., SHA-1) or a Message-Digest 5 (MD5) function, can provide the fingerprint by inputting the data segment into the hash function. The hash function can be collision-resistant to protect against duplicate fingerprints for data segments having differing data.

The loading module 118 is configured to identify one or both of data 131A-B and the segment tree 134 from the persistent storage 130 and load that data 131A-B and/or segment tree 134 into the working memory 110. The loading module 118 can load one or both of data 131A-B and the segment tree 134 to be processed by another module 112-116, 120-122. The loading module 118 can identify the segment tree 134 and data 131A-B using an identifier of the client 102 that is sent with an image of a data block 103A-B to be stored at the server 105. The identifier can be included in metadata associated with the image of the data block 103A-B or separately included. In one embodiment, the loading module 118 identifies the segment tree 134 using the identifier of the client 102 (e.g., the server 105 has stored therein a dataset 131 for the client 102 and the dataset 131 is associated with the segment tree 134), and subsequently identifies the data 131A-B from the segment tree 134.

The loading module 118 can load data 131A-B and the segments references from the segment tree 134 in response to receiving an image of one or more data blocks 103A-B from the client 102. The client 102 can include a log of correspondence identifiers with the image of the data blocks 103A-B so that the server 105 can identify the corresponding data 131A-B stored at the server 105. For example, the client can send an image of the data block 103A, which corresponds to the data 131A at the server 105, and in response the loading module 118 can load the segment tree 134 and/or data 131A so that it can be processed by another module 112-116, 120-122. This responsive loading by the loading module 118 can be particularly applicable in instances of incremental backups. Because the size of the working memory 110 is limited, the loading module 118 can iteratively load data 131A-B from the dataset 131 so that the dataset 131 can be iteratively processed in the working memory 110.

In one embodiment, the boundaries of the data segments 132A-H are realigned by the segmenting module 114 and the loading module 118. For example, where the client sends an image that is to update data that begins by overlapping data segment 132B and ends by overlapping data segment 132G, the loading module 118 can load the first overlapping data segment 132B, the last overlapping segment 132G and the segment 132H following the last overlapping segment 132G into the working memory 110. In the working memory 110, the segmenting module 114 aligns the fresh data by prepending the data segment 132B and appending the data segments 132G-H to the fresh data and then segmenting this fresh data so that a segment boundary (e.g., an offset) of the appended segments 132G-H aligns with a boundary of those data segments in the stored dataset 131. In another embodiment, if the data segments 132A-H are of a fixed size then the loading module 118 does not need to load any stored data segments 132A-H in the working memory 110 because the segment boundaries do not need to be realigned.

In one embodiment, a subset of the segment references comprising the segment tree 134 associated with the dataset 131 for the client 102 can be loaded into the working memory 110 by the loading module 118 without loading any of the dataset 131—e.g., metadata (i.e., segment references of the segment tree 134) can be loaded into the working memory 110 without loading the content data (i.e., data 131A-B) from the persistent storage 130. The number of segment references loaded from the segment tree 134 can vary, such as a percentage of the segment tree 134 or an available amount of the working memory 110. This size can be statically defined at the point of implementation or can be configurable by a user of the system 100. Thus, fingerprints associated with the data 131A-B can be processed by a module 112-122 in the working memory 110 without consuming additional resources retaining data 131A-B in the working memory 110 (particularly where such data is not processed).

The comparison module 120 is configured to compare, in the working memory 110, fingerprints generated for fresh data segments loaded into the working memory 110 to fingerprints from the segment tree 134 loaded from the loading module 118 (i.e., fingerprints associated with the pre-existing data segments 132A-H). The comparison module 120 can implement any suitable algorithm for comparing fingerprints and can sort one or both of the sets of fingerprints according to a well-known sorting algorithm to optimize the comparison. Where the comparison module 120 determines that a fingerprint for a fresh data segment matches a fingerprint associated with a pre-existing data segment 132A-H, the comparison module 120 can remove that fresh data segment from the working memory 110, such as by deleting that fresh data segment, so that resources of the server 105 are not consumed by processing data that already exists in the data storage server 105.

In one embodiment, the comparison module 120 employs additional filtering techniques to determine the uniqueness of segments in the data storage system 105. For example, the data storage server 105 can include a database of all fingerprints that is accessible by the comparison module 120. Accordingly, the comparison module 120 can refer to the database to determine if a data segment of the fresh data is stored in the system, e.g., as part of a second dataset (not shown) referred to by a second segment tree (not shown).

Where a fingerprint for a fresh data segment does not match a fingerprint from the segment tree 134 that has been loaded into the working memory 110 by the loading module 118 (or is otherwise determined to be unique), the comparison module 120 can retain the fresh data segment in the working memory 110 until the comparison module 120 determines that the fresh data segment updates a corresponding data segment 132A-H stored in the persistent storage 130. Where the comparison module 120 determines that the fresh data segment updates a pre-existing data segment 132A-H (and is not simply absent from the segment references loaded into working memory 110), the comparison module 120 can provide the fresh data segment to the write module 122. In one embodiment, the comparison module 120 determines that the fresh data segment updates a corresponding pre-existing data segment 132A-H where a correspondence identifier (e.g., an address) of the fresh data segment matches a correspondence identifier from the segment tree 134 that is associated with a data segment 132A-H loaded into the working memory 110 (and where the fingerprints of the two data segments do not match).

The write module 122 is configured to receive fresh data segments and store those data segments in the persistent storage 130. Where the fresh data segments do not correspond to any data stored in the persistent storage 130, the write module 132 is configured to store the fresh data segments as seed data. Subsequently, the seed data can be updated by the write module 131 so that the dataset 131 is current and can, for example, be used as a backup to restore or retrieve data for the client 102.

In order for the write module 122 to update a data segment 132A-H, the write module 122 can receive a fresh data segment that is to update a corresponding data segment 132A-H from the comparison module 120, overwrite the corresponding data segment 132A-H and store the updated data 131A-B in the persistent storage 130. In one embodiment, the write module 122 updates multiple data segments 132A-H with multiple fresh data segments, and the multiple data segments 132A-H can be from different data 131A-B of the dataset 131 (n.b., this is contingent upon the available data in working memory 110 as loaded by the loading module 118).

In some embodiments, a fresh data segment is not physically written over a corresponding pre-existing data segment 132A-H in the persistent storage 130. Rather, a fresh data segment is logically written over a corresponding pre-existing data segment 132A-H—that is, a segment reference of the segment tree 134 is updated to be associated with the fresh data segment (stored in the persistent storage 130). In a deduplication system, a pre-existing data segment 132A-H can be shared among multiple segment trees and, therefore, logically overwriting a pre-existing segment 132A-H may result in physically writing new segments to the persistent storage 130 instead of physically overwriting a pre-existing segment 132A-H. In particular, where the pre-existing data segments 132A-H are of varying sizes, a fresh data segment may be of a different size than its corresponding pre-existing data segment and, therefore, the fresh data segment should only logically overwrite a pre-existing data segment 132A-H (i.e., update the segment tree 134) so that the pre-existing data segments 132A-H are not disturbed (e.g., where other segment trees in the data storage server 105 reference the pre-existing data segments 132A-H). In an illustrative embodiment in which the data storage server 105 implements log-structured storage, the pre-existing data segments 132A-H are never physically over-written by definition.

According to some embodiments, the write module 122 can update the segment tree 134 so that a segment reference for the updated data segment 132A-H includes accurate metadata. For example, the write module 122 can update the segment size and/or the fingerprint of a segment reference associated with the updated data segment 132A-H. In one embodiment, the write module 122 does not write a fresh data segment to the persistent storage 130. Rather, the write module 122 logically overwrites a pre-existing data segment 132A-H by updating the segment tree 134 to reference a different pre-existing data segment 132A-H. For example, a fresh data segment can correspond to a first pre-existing data segment 132A but have the same fingerprint (i.e., the same data) as a second pre-existing data segment 132E. Therefore, the write module 122 may logically overwrite the first pre-existing data segment 132A by updating a segment reference of the segment tree 134 that was originally associated with the first data segment 132A to be associated with the second data segment 132E.

The persistent storage 130 can be implemented locally (e.g., single-node operating environment) or remotely (e.g., multi-node operating environment) via an interconnect, which can be a bus (as illustrated) or a network. The persistent storage 130 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. The persistent storage 130 can also be a combination of such devices. In the case of disk storage media, the persistent storage 130 can be organized into one or more volumes of Redundant Array of Inexpensive Disks (RAID).

The persistent storage 130 can operate as active storage to store external or fresh user data. In one embodiment, the data storage server 105 includes one or more additional persistent storage devices that operate according to an archiving policy or scheme so that one persistent storage device operates as a target persistent storage device to periodically archive data from the active persistent storage device.

Figure 2A:
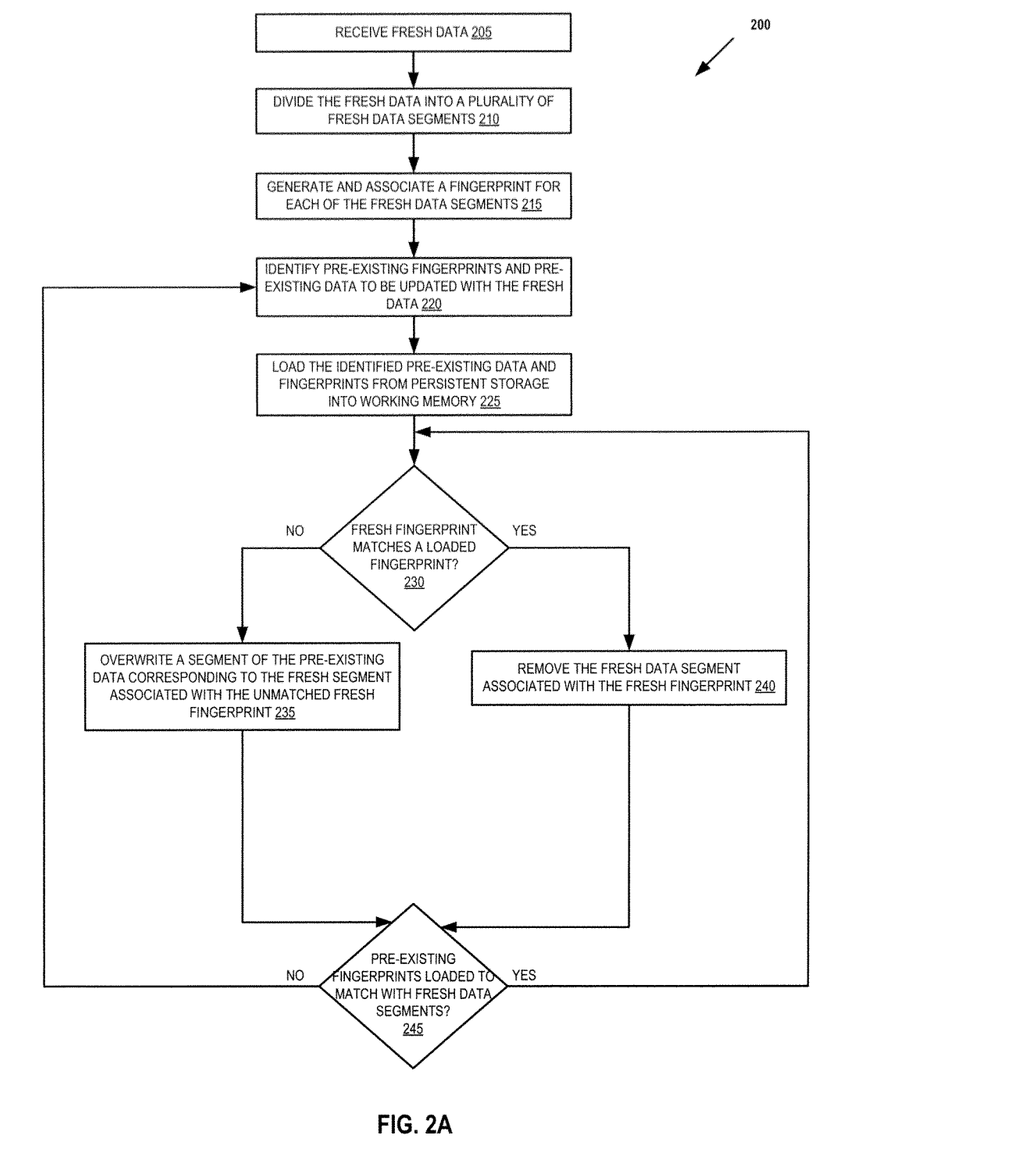
FIG. 2A is a flowchart of illustrating a method for improving deduplication techniques in a data storage system according to one embodiment of the invention.

With respect to FIG. 2A, a flow diagram illustrates one embodiment of a method for implementing a deduplication technique for improving data compression in a storage system. The operations of FIG. 2A are illustrative and are not necessarily performed in the order depicted. The method 200 can be performed by, for example, the data storage system 105 of FIG. 1.

FIG. 2A illustrates an embodiment of a method 200 in which the system implementing the method 200 has stored therein pre-existing data that corresponds to the fresh data. In one embodiment, the pre-existing data is part of a seed dataset that has been received and stored in the system. Preferably, this seed dataset has been divided into data segments according to a specific policy or algorithm, and therefore the seed dataset is fractionally manipulatable. The seed dataset can be, for example, a backup dataset for a client. The seed dataset can have been updated since its original seed state.

Beginning first with operation 205, fresh data is received from a client. Preferably, this fresh data corresponds to the pre-existing data. In one embodiment, both the fresh data and the pre-existing data are received from a same client. Alternatively, the pre-existing data can be from a second client, but suitable for the client sending the fresh data. The fresh data can be received as a stream of data from a client.

Metadata, such as an identifier (e.g., and address), can be included with the fresh data so that a correspondence with a pre-existing data segment of the pre-existing data can be determined. For example, a physical or logical address or an offset from an address can be included with the metadata. In one embodiment, such metadata is included from a log file at the client and contains identifiers or other information for changed blocks included in the fresh data.

At operation 210, the fresh data is divided into a plurality of fresh data segments. Preferably, the fresh data is divided according to a specific policy or algorithm that is consistent with that used to divide the pre-existing data so that fresh data segments correspond to those pre-existing data segments and can be used to overwrite one or more pre-existing data segments where appropriate. Proceeding to operation 215, a fingerprint is generated for a fresh data segment. The fingerprint can be generated using a collision-resistant hash function (e.g., an MD-5 or SHA-1 hash function) to ensure that segments having different data are identifiably unique. The fingerprint for the fresh data segment can be generated using the content data of the fresh data segment and none, some or all of the metadata associated with the fresh data segment.

Preferably, a fingerprint is generated for each segment of the fresh data. However, the method 200 can proceed to the other illustrated operations 220-245 before or contemporaneously with generating fingerprints for other fresh data segments.

At operation 220, pre-existing data that is to be updated by the fresh data is identified along with the pre-existing fingerprints that are associated with the pre-existing data. The pre-existing data can be part of a larger dataset that is suitable for the client. For example, the pre-existing data can be a fraction of the data segments comprising the dataset that is an image for recovery and restoration of the client. In one embodiment, the pre-existing data is identified using a segment tree associated with the pre-existing data for the client and metadata included with the fresh data—e.g., the segment tree can contain pointers which reference the pre-existing data segments that comprise the pre-existing data for the client. The pre-existing data can be identified, for example, by matching one or more identifiers (e.g., addresses) of the fresh data segments to segment references of the segment tree associated with the pre-existing data for the client and identifying segments of the pre-existing data to which matched segment references point. Alternatively, the pre-existing data that is to be updated and the associated fingerprints can be identified as part of a sequential iteration through a pre-existing dataset that is stored for a client—e.g., pre-existing data segments for a client can be enumerated and thus sequentially identified.

Similar to identifying data, pre-existing fingerprints can be identified using the segment tree associated with pre-existing data for the client—e.g., segment references of the segment tree can contain fingerprints associated with the pre-existing data segments to which the segment references point. The pre-existing fingerprints can be identified, for example, by matching one or more identifiers (e.g., addresses) of the fresh data segments to segment references of the segment tree associated with the client's pre-existing data and identifying pre-existing fingerprints included in those segment references. Alternatively, the pre-existing fingerprints can be identified as part of a sequential iteration through the segment tree—e.g., the segment references of the segment tree associated with the client's pre-existing data can be enumerated and thus fingerprints included in those segment references can be sequentially identified.

In one embodiment, additional pre-existing fingerprints of the segment tree associated with the client's pre-existing data are identified to be loaded into working memory. Preferably, each pre-existing segment is identified in combination with its associated fingerprint. However, not each fingerprint must have its associated pre-existing data segment contemporaneously loaded into working memory. Because the size of a fingerprint is appreciably smaller than the size of a data segment, a substantially quantity of fingerprints can be loaded into working memory. The number fingerprints that are loaded separately from their associated data segments can vary, such as a percentage of the number of fingerprints in persistent storage or an available amount of working memory. This size can be statically defined or can be received as input from a user.

With pre-existing data and associated fingerprints identified, operation 225 illustrates that such information is loaded from persistent storage into working memory. Generally, an entire dataset stored for the client at the system implementing the method 200 will exceed the available working memory of the system. Consequently, data segments that comprise the dataset must be incrementally loaded into working memory and, therefore, the dataset can be incrementally updated. In loading the pre-existing data into working memory, the associated fingerprints for that pre-existing data are contemporaneously loaded into working memory and, in fact, the pre-existing data can be loaded into working memory as a result of the loading of the associated fingerprints.

In one embodiment, the fresh data may not align exactly with the pre-existing data segments. In working memory, an identified data segment that overlaps the beginning of the fresh data can be prepended to fresh data and, similarly, another identified data segment that overlaps the end of the fresh data can be appended to the fresh data (along with one or more segments that are identified as following the last overlapping segment). As illustrated in operation 210, this fresh data can be divided into a plurality of segments and, preferably, one of the segment boundaries for the data appended to the fresh data will be aligned with a boundary of the pre-existing dataset stored in persistent storage. In one embodiment, operation 215 is performed here after the pre-existing data segments have been identified, prepended or appended to the fresh data, and the fresh data has been subsequently divided into segments.

Where the pre-existing data and associated fingerprints have been identified and loaded into working memory, they can be processed so that data can be optimally updated and stored. At decision block 230, a fresh fingerprint generated for a fresh data segment is compared to those pre-existing fingerprints that have been loaded into working memory.

The fresh fingerprint can be compared using any suitable comparison algorithm. In one embodiment, one or more segment references of the segment tree that is loaded into working memory is searched to determine if the fresh fingerprint is an element of the segment references of the segment tree that are available in working memory.

As illustrated at operation 235, if a matching fingerprint is not found, then the fresh data segment associated with the unmatched fresh fingerprint is written over the corresponding pre-existing data segment in the persistent storage. Accordingly, the updated data will be available at a later time for the client, such as where the client is to be restored from a backup image. In one embodiment, the updated data is buffered before being written to the persistent storage while the method 200 proceeds to decision block 245.

In some embodiments, a fresh data segment is not physically written over a corresponding pre-existing data segment in persistent storage. Rather, a fresh data segment is logically written over a corresponding pre-existing data segment—that is, a segment reference of a segment tree is updated to be associated with the fresh data segment. In a deduplication system, a pre-existing data segment can be shared among multiple segment trees and, therefore, logically overwriting a pre-existing segment may result in physically writing new segments to persistent storage instead of physically overwriting a pre-existing data segment. In particular, where the pre-existing data segments are of varying sizes, a fresh data segment may be of a different size than its corresponding pre-existing data segment and, therefore, the fresh data segment should only logically overwrite a corresponding pre-existing data segment (i.e., update the segment tree) so that the pre-existing data segments are not disturbed (e.g., where other segment trees reference the pre-existing data segments).

In one embodiment of operation 235, the fresh data segment is not physically written to the persistent storage. Rather, the segment tree is updated to reference a different pre-existing data segment already stored in the persistent storage. For example, a fresh data segment can correspond to a first pre-existing data segment but have the same fingerprint (i.e., the same data) as a second pre-existing data segment. Therefore, the first pre-existing data segment can be logically overwritten by updating a segment reference of the segment tree that was originally associated with the first data segment to be associated with a second data segment that has a fingerprint matching that of the fresh data segment.

Operation 240 illustrates that where the fresh fingerprint matches at least one of the pre-existing fingerprints that have been loaded into working memory, the fresh data segment associated with the fresh fingerprint is removed from the system implementing the method 200. The fresh data segment can be removed by, for example, deleting the fresh data segment, removing any pointers to the fresh data segment or any other suitable method. Accordingly, the fresh data segment associated with the matching fingerprint does not consume resources of the system and a segment reference to a pre-existing data segment can be used so that additional input/output (I/O) operations are not introduced into the system.

Following both operations 235 and 240, it is determined at decision block 245 if any pre-existing fingerprints that are loaded into the working memory are to be compared with the fresh fingerprints associated with the fresh data segments. Where there is no remaining fresh data, the method 200 ends. If all of the fresh data corresponding to the loaded data has either been removed or written over the loaded pre-existing data, any updated data that is buffered at operation 235 can be written to the persistent storage and, subsequently, operation 220 is revisited. Again at operation 220, pre-existing data that is to be updated with the remaining fresh is identified. The method 200 then iterates through the operations 220-245 as described above.

Where fresh data—i.e., fresh data that has not been discarded or used to overwrite pre-existing data—remains in the working memory, the method 200 revisits decision block 230. At decision block 230, another fresh fingerprint is compared to the loaded pre-existing fingerprints and the method 200 continues through operations 235-245 as described. Where no fresh data remains in working memory, the method 200 ends.

Figure 2B:
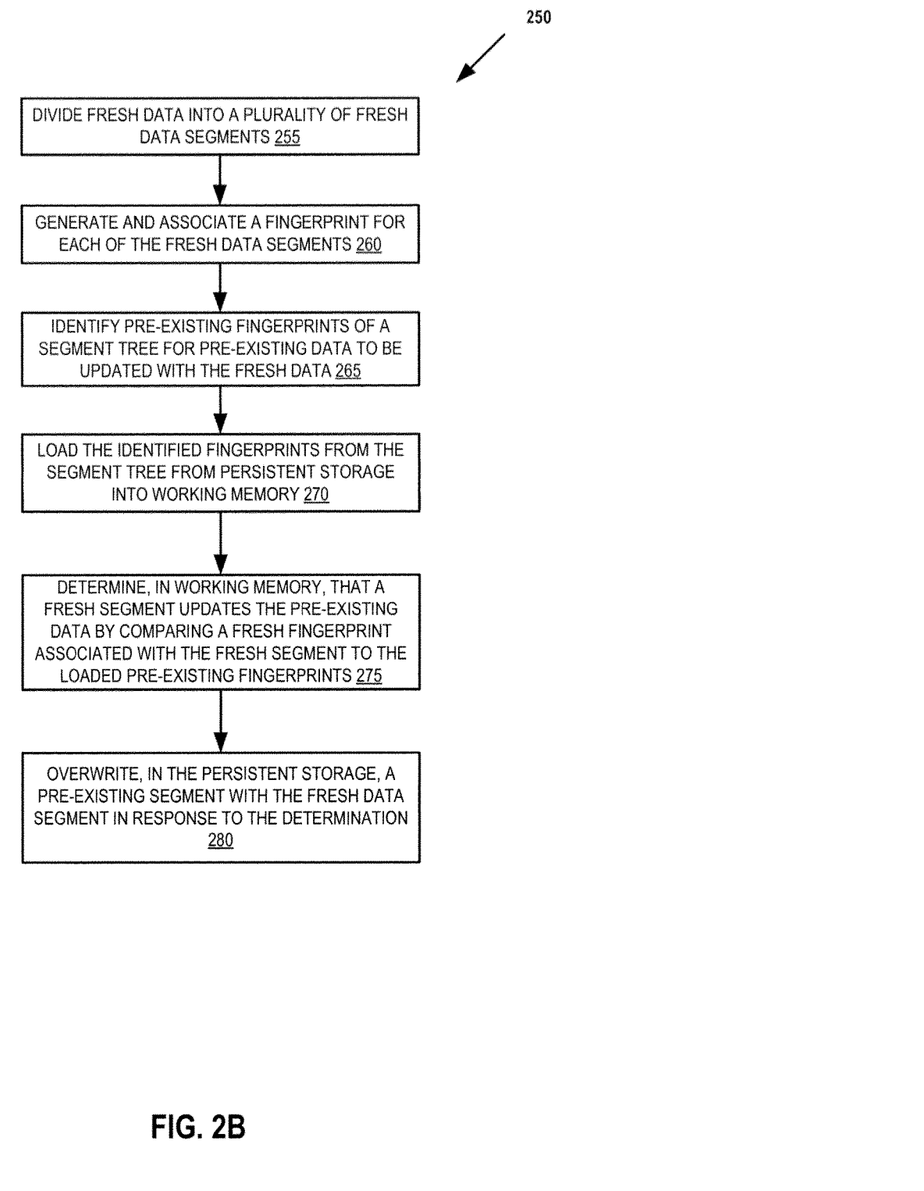
FIG. 2B is a flowchart of illustrating a method for improving deduplication techniques in a data storage system according to one embodiment of the invention.

With respect to FIG. 2B, a flow diagram illustrates one embodiment of a method 250 for implementing a deduplication technique for improving data compression in a storage system. The operations of FIG. 2B are illustrative and are not necessarily performed in the order depicted. The method 250 can be performed by, for example, the data storage system 105 of FIG. 1.

FIG. 2B illustrates an embodiment of a method 250 in which the system implementing the method 200 has stored therein pre-existing data that corresponds to the fresh data. In one embodiment, the pre-existing data is part of a seed dataset that has been received and stored in the system. Preferably, this seed dataset has been divided into data segments according to a specific policy or algorithm, and therefore the seed dataset is fractionally manipulatable. The seed dataset can be, for example, a backup dataset for a client. The seed dataset can have been updated since its original seed state.

Beginning first with operation 255, fresh data is divided into a plurality of fresh data segments. Preferably, this fresh data is received from a client and corresponds to the pre-existing data. In one embodiment, both the fresh data and the pre-existing data are received from a same client. Alternatively, the pre-existing data can be from a second client, but suitable for the client sending the fresh data. The fresh data can be received as a stream of data from a client.

Metadata, such as an identifier (e.g., and address), can be included with the fresh data so that a correspondence with a pre-existing data segment of the pre-existing data can be determined. For example, a physical or logical address or an offset from an address can be included with the metadata. In one embodiment, such metadata is included from a log file at the client and contains identifiers or other information for changed blocks included in the fresh data.

Proceeding to operation 260, a fingerprint is generated for a fresh data segment. The fingerprint can be generated using a collision-resistant hash function (e.g., an MD-5 or SHA-1 hash function) to ensure that segments having different data are identifiably unique. The fingerprint for the fresh data segment can be generated using the content data of the fresh data segment and none, some or all of the metadata associated with the fresh data segment.

At operation 265, pre-existing fingerprints are identified. The pre-existing fingerprints are of a segment tree for pre-existing data corresponding to the fresh data. The pre-existing fingerprints can be identified using the segment tree associated with pre-existing data for the client—e.g., segment references of the segment tree can contain fingerprints associated with the pre-existing data segments to which the segment references point. The pre-existing fingerprints can be identified, for example, by matching one or more identifiers (e.g., addresses) of the fresh data segments to segment references of the segment tree associated with the client's pre-existing data and identifying pre-existing fingerprints included in those segment references. Alternatively, the pre-existing fingerprints can be identified as part of a sequential iteration through the segment tree—e.g., the segment references of the segment tree associated with the client's pre-existing data can be enumerated and thus fingerprints included in those segment references can be sequentially identified. In one embodiment, additional pre-existing fingerprints of the segment tree associated with the client's pre-existing data are identified to be loaded into working memory.

With pre-existing data fingerprints identified, operation 270 illustrates that such information is loaded from persistent storage into working memory. In one embodiment, this operation 270 includes loading segment references of the segment tree into working memory. The segment references in working memory can then be updated.

In one embodiment, the fresh data may not align exactly with the pre-existing data segments. In working memory, an identified data segment that overlaps the beginning of the fresh data can be prepended to fresh data and, similarly, another identified data segment that overlaps the end of the fresh data can be appended to the fresh data (along with one or more segments that are identified as following the last overlapping segment). As illustrated in operation 255, this fresh data can be divided into a plurality of segments and, preferably, one of the segment boundaries for the data appended to the fresh data will be aligned with a boundary of the pre-existing dataset stored in persistent storage. In one embodiment, operation 260 is performed here after the pre-existing data segments have been identified, prepended or appended to the fresh data, and the fresh data has been subsequently divided into segments.

Where the pre-existing data fingerprints have been identified and loaded into working memory, they can be processed so that data can be optimally updated and stored. At decision block 275, it is determined, in working memory, if a fresh data segment updates the pre-existing data by comparing a fresh fingerprint generated for that fresh data segment to those pre-existing fingerprints that have been loaded into working memory. The fresh fingerprint can be compared using any suitable comparison algorithm. In one embodiment, one or more segment references of the segment tree that is loaded into working memory is searched to determine if the fresh fingerprint is an element of the segment references of the segment tree that are available in working memory. In one embodiment, the fresh data segment is buffered in working memory so that other fresh fingerprints can be loaded into working memory to be compared to the fresh fingerprint associated with the fresh data segment. Thus, the determination is made after all the pre-existing fingerprints of the segment tree have been loaded into working memory and compared to the fresh fingerprint associated with the fresh data segment.

As illustrated at operation 280, where the determination is made that the fresh fingerprint associated with the fresh data segment does not match a pre-existing fingerprint of the segment tree associated with the dataset for the client, then the fresh data segment associated with the unmatched fresh fingerprint is written over the corresponding pre-existing data segment in the persistent storage. Accordingly, the updated data will be available at a later time for the client, such as where the client is to be restored from a backup image.

In some embodiments, a fresh data segment is not physically written over a corresponding pre-existing data segment in persistent storage. Rather, a fresh data segment is logically written over a corresponding pre-existing data segment—that is, a segment reference of a segment tree is updated to be associated with the fresh data segment. In a deduplication system, a pre-existing data segment can be shared among multiple segment trees and, therefore, logically overwriting a pre-existing segment may result in physically writing new segments to persistent storage instead of physically overwriting a pre-existing data segment. In particular, where the pre-existing data segments are of varying sizes, a fresh data segment may be of a different size than its corresponding pre-existing data segment and, therefore, the fresh data segment should only logically overwrite a corresponding pre-existing data segment (i.e., update the segment tree) so that the pre-existing data segments are not disturbed (e.g., where other segment trees reference the pre-existing data segments).

In one embodiment of operation 280, the fresh data segment is not physically written to the persistent storage. Rather, the segment tree is updated to reference a different pre-existing data segment already stored in the persistent storage. For example, a fresh data segment can correspond to a first pre-existing data segment but have the same fingerprint as a second pre-existing data segment. Therefore, the first pre-existing data segment can be logically overwritten by updating a segment reference of the segment tree that was originally associated with the first data segment to be associated with a second data segment that has a fingerprint matching that of the fresh data segment.

Figure 3:
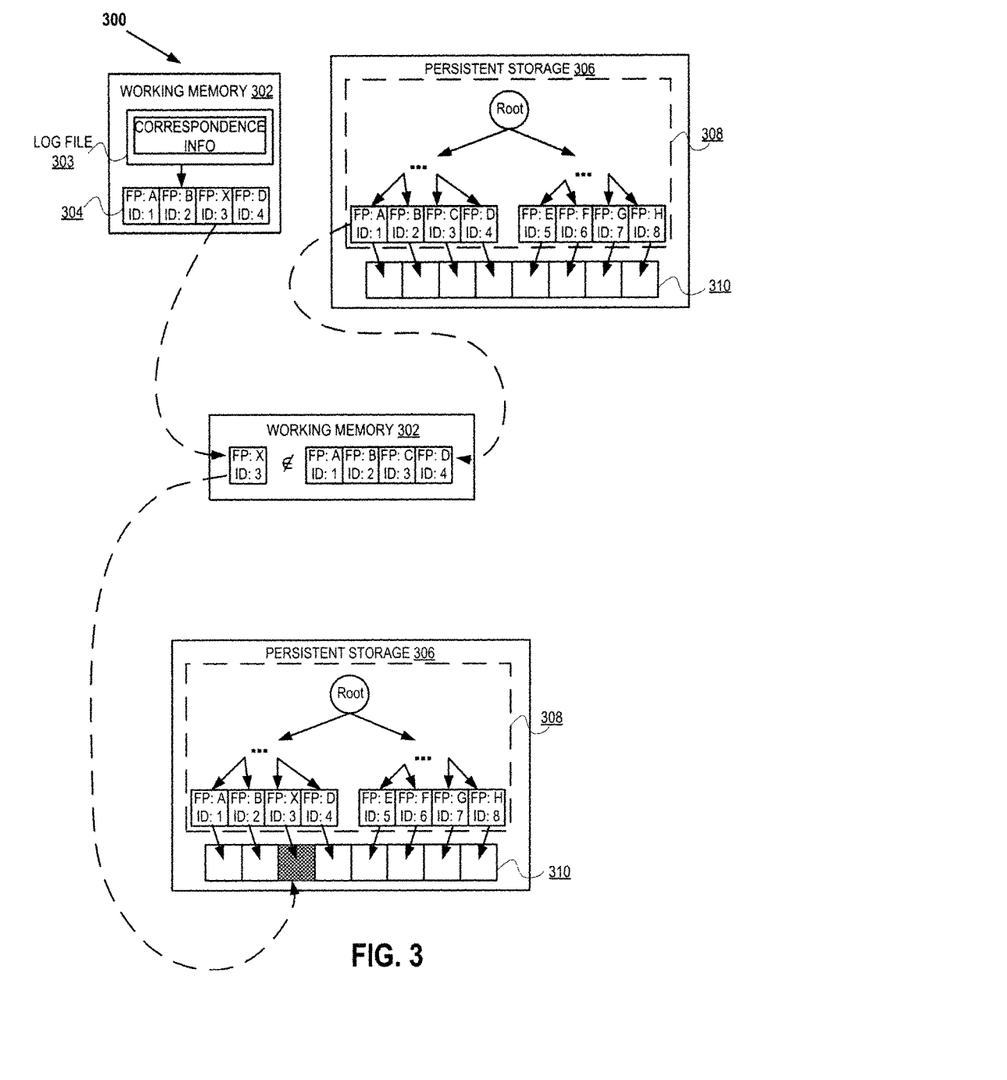
FIG. 3 is a block diagram illustrating a temporal sequence for improving deduplication techniques in a data storage system according to one embodiment of the invention.

With respect to FIG. 3, a block diagram is shown illustrating a temporal sequence 300 for improving deduplication techniques in a data storage system according to one embodiment of the invention. The temporal sequence 300 can be performed by, for example, the data storage system 105 of FIG. 1. Therefore, the working memory 302 can be or can include the working memory 110, the persistent storage 306 can be or can include the persistent storage 130, the fresh data 304 can be or can include an image of data blocks 103A-B received from the client 102, etc.

As illustrated, fresh data 304 is loaded into the working memory 302. Subsequently, the fresh data 304 is divided into a plurality of segments. The fresh data 304 can be divided into a plurality of segments according to a specific algorithm. This specific algorithm can be the same algorithm as that used to generate the pre-existing data segments 310.

Preferably, the fresh data 304 corresponds to the pre-existing data segments 310 and, therefore, each fresh data segment corresponds to a pre-existing data segment of the pre-existing data segments 310 in the persistent storage 306. This correspondence can be established by correspondence information 303 that is included by a client providing the fresh data 304 (e.g., from a log file at the client). The correspondence information 303 can identify the client, the block(s) of fresh data 304 (e.g., an address), and the size(s) of the block(s). In one embodiment, the fresh data 304 is segmented and metadata is generated that includes an identifier (ID) for each segment of the fresh data 304. The identifier for a respective segment of the fresh data 304 can be generated using the correspondence information 303 as well as properties of the algorithm used to segment the fresh data 304 (e.g., a size of a segment of the fresh data 304).

Subsequently, a fingerprint (FP) is generated for each segment of the fresh data 304. Fingerprints are generated to ensure that segments having the same data (e.g., bit pattern or byte pattern) also have the same fingerprints and that segments having differing data have differing fingerprints. Though illustrated in FIG. 3 as within the segments of fresh data 304, the identifiers and the fingerprints are generally not included in the content data of the segments. Rather, the identifiers and fingerprints can be assigned to one or more data structures associated with the segments.

The pre-existing data segments 310 to which the fresh data segments 304 correspond are stored in the persistent storage 306 and are individually identifiable using a segment tree 308. The segment tree 308 can be used to construct data (e.g., a file) for a client, such as a backup image for recovery and restoration. To construct such data, the segment tree 308 can be a hierarchically organized tree of segment references.

After the fresh data 304 is loaded into the working memory 302, the segment tree 308 for the pre-existing data segments 310, or a segment reference of the segment tree 308, is also loaded into the working memory 302. In some embodiments, a plurality of segments of the pre-existing data segments 310 is also loaded into the working memory 302 from the persistent storage 306. Segment references of the segment tree 308 can be loaded into the working memory 302 in response to the fresh data 304, such as correspondence information 303 included with the fresh data 304, or derived from the correspondence information 303 and the process of dividing the fresh data 304 into segments. Alternatively, the segment references can be loaded as a sequential iteration through all segments of the pre-existing data segments 310.

Each segment of the plurality is associated with a segment reference of the segment tree 308 that is loaded into the working memory 310. However, not each segment reference of the segment tree 308 loaded into the working memory 302 must have the associated pre-existing data segments contemporaneously loaded into the working memory 302. Because the size of a segment reference is appreciably smaller than the size of a data segment, a substantially quantity of segment references from the segment tree 308 can be loaded into the working memory 302, and therefore fresh data segments that duplicate pre-existing data segments can be removed. For example, the segment references having identifiers 5-8 and fingerprints E-H can be loaded into the working memory 302 without loading the associated data segments from the pre-existing data segments 310 and, therefore, the segments of fresh data 304 can be compared to additional fingerprints E-H to eliminate any duplicates (although none are shown).

Having loaded data segments of the pre-existing data segments 310 and the segment references of the segment tree 308 into the working memory 302, a fresh data segment of the fresh data 304 is compared to those segment references in the working memory 302. If a fingerprint associated with a segment of the fresh data 304 matches a fingerprint of the loaded segment references in the working memory 302, then that fresh data segment can be removed (e.g., deleted) to free up resources such as memory and processing speed.

Where a fingerprint associated with a fresh data segment does not match—i.e., is not an element of—any of the fingerprints of the loaded segment references, that fresh data segment can be written over a corresponding pre-existing data segment. As illustrated in FIG. 3, a fresh data segment has the fingerprint X and an identifier 3. This fresh data segment corresponds to the pre-existing data segment pointed to by the segment reference having the identifier 3. However, the pre-existing data segment has the fingerprint C (as indicated by the segment reference). Because the fresh data segment corresponds to a pre-existing data segment but is not associated with a fresh fingerprint that matches the pre-existing fingerprint associated with the pre-existing data segment, the pre-existing data segment is overwritten by the fresh data segment. The updated data segment is subsequently stored in persistent storage. Furthermore, the segment reference for the segment is updated to reflect that the fingerprint is now X. In one embodiment, other properties (not illustrated) of the segment reference for the updated segment are modified, such as a segment size.

In some embodiments, a fresh data segment is not physically written over a corresponding pre-existing data segment from the pre-existing data segments 310. Rather, a fresh data segment is logically written over a corresponding pre-existing data segment from the pre-existing data segments 310—that is, a segment reference of the segment tree 308 is updated to be associated with the fresh data segment. In a deduplication system, a pre-existing data segment from the pre-existing data segments 310 can be shared among multiple segment trees and, therefore, logically overwriting a pre-existing data segment may result in physically writing new segments to the persistent storage 306 instead of physically overwriting a pre-existing segment from the pre-existing data segments 310. In particular, where the pre-existing data segments 310 are of varying sizes, a fresh data segment may be of a different size than its corresponding pre-existing data segment and, therefore, the fresh data segment should only logically overwrite a pre-existing data segment (i.e., update the segment tree 308) so that the pre-existing data segments 310 are not disturbed.

If the pre-existing data segment that corresponds to the fresh data segment associated with the unmatched fresh fingerprint is loaded into the working memory 302, then the fresh data segment can be immediately written over the pre-existing data segment and stored in the persistent storage 306. However, if the fresh data segment does not match a pre-existing fingerprint that is loaded into working memory, the fresh data can be buffered in the working memory 302 until the corresponding pre-existing data segment is loaded into working memory. A buffered fresh fingerprint can require that its associated fingerprint undergo additional comparisons with newly loaded pre-existing fingerprints so that it can be determined that a pre-existing fingerprint associated with the corresponding pre-existing data segment does not match.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computer-implemented method executed by a data storage system having a persistent storage, the method comprising:
    dividing first data into a first plurality of segments, wherein the first data includes a first block of data of a file that has been changed from a prior version of the file, wherein the first data is associated with a client application;
    generating a first plurality of fingerprints such that each segment of the first plurality of segments is associated with a respective fingerprint of the first plurality of fingerprints;
    identifying, in the persistent storage of the data storage system, a segment tree associated with second data based on an identifier associated with the client application, the second data is to be updated by the first data and a second plurality of fingerprints associated with the second data, wherein the second data is divided into a second plurality of segments, wherein the second data represents a second block of data of the prior version of the file corresponding to the first block of data;
    loading the identified second plurality of fingerprints from the persistent storage of the data storage system into a cache memory of the data storage system;
    determining, in the cache memory, whether a first segment of the first data updates the second data by comparing a first fingerprint associated with the first segment to the second plurality of fingerprints that is associated with the second data, wherein the first segment of the first data would update the second data if the first fingerprint does not match with any of fingerprints of the second plurality of segments, and would not update the second data if the first fingerprint matches at least one of the fingerprints of the second plurality of segments;
    replacing, in the persistent storage of the data storage system, a second segment of the second data with the first segment of the first data if the first fingerprint does not match with any of the fingerprints of the second plurality of segments, including modifying a segment reference of the segment tree associated with the second data to reference the first segment instead of the second segment; and
    removing the first segment of the first data from the data storage system if the first fingerprint matches at least one of the fingerprints of the second plurality of segments, including deleting the first segment of the first data and the first fingerprint associated with the first segment;
    wherein replacing the second segment of the second data with the first segment of the first data further includes logically replacing the second segment by updating the segment tree associated with the second data.

2. The method of claim 1, further comprising:
    receiving, by the data storage system, the first data from a remote system.

3. The method of claim 2, wherein the remote system is configured to provide primary storage and the data storage system is configured to provide backup storage for the remote primary storage system.

4. The method of claim 1, further comprising:
    determining that a third segment of the first data does not update the second data by matching a second fingerprint associated with the third segment of the first data to a third fingerprint included in the second plurality of fingerprints; and
    removing the third segment of the first data from the data storage system in response to the determination.

5. The method of claim 4, further comprising:
    loading, into the cache memory, a third plurality of fingerprints that is associated with third data stored in the persistent storage, wherein the third data is not loaded into the cache memory;
    determining that the third segment of the first data does not update the third data by comparing the second fingerprint to a fourth fingerprint of the third plurality of fingerprints; and
    removing the second segment from the data storage system in response to the determination.

6. The method of claim 5, wherein a size of the third plurality of fingerprints is configurable, the method further comprising:
    receiving the size as input from a user.

7. The method of claim 5, wherein the second data and the third data are included in an image stored in the persistent storage.

8. The method of claim 7, wherein the second and third pluralities of fingerprints are part of a segment associated with the image.

9. The method of claim 1, wherein a respective fingerprint of the first plurality of fingerprints is generated by inputting a respective segment into a cryptographic hash function.

10. The method of claim 9, wherein the cryptographic hash function is one of a Secure Hash Algorithm (SHA) function and a Message-Digest 5 (MD5) function.

11. The method of claim 1, wherein updating the segment tree associated with the second data comprises:
    updating a segment reference of the segment tree associated with the second data to point to a pre-existing data segment stored in the persistent storage of the data storage system, wherein the pre-existing data segment includes same data as the first segment of the first data.

12. A non-transitory computer-readable storage medium having instructions stored therein, which when executed by a data storage system, cause the data storage system to perform operations, the operations comprising:

dividing first data into a first plurality of segments, wherein the first data includes a first block of data of a file that has been changed from a prior version of the file, wherein the first data is associated with a client application;

generating a first plurality of fingerprints such that each segment of the first plurality of segments is associated with a respective fingerprint of the first plurality of fingerprints;

identifying a segment tree associated with second data stored in a persistent storage of the data storage system based on an identifier associated with the client application, the second data is to be updated by the first data and a second plurality of fingerprints associated with the second data, wherein the second data is divided into a second plurality of segments, wherein the second data represents a second block of data of the prior version of the file corresponding to the first block of data;

loading the identified second plurality of fingerprints from the persistent storage of the data storage system into volatile memory of the data storage system;

determining, in the volatile memory, whether a first segment of the first data updates the second data by comparing a first fingerprint associated with the first segment to the second plurality of fingerprints that is associated with the second data, wherein the first segment of the first data would update the second data if the first fingerprint does not match with any of fingerprints of the second plurality of segments, and would not update the second data if the first fingerprint matches at least one of the fingerprints of the second plurality of segments;

overwriting, in the persistent storage of the data storage system, a second segment of the second data with the first segment of the first data if the first fingerprint does not match with any of the fingerprints of the second plurality of segments, including modifying a segment reference of the segment tree associated with the second data to reference the first segment instead of the second segment; and removing the first segment of the first data from the data storage system if the first fingerprint matches at least one of the fingerprints of the second plurality of segments, including deleting the first segment of the first data and the first fingerprint associated with the first segment;

wherein overwriting the second segment of the second data with the first segment of the first data further includes logically overwriting the second segment by updating the segment tree associated with the second data.

13. The non-transitory computer-readable storage medium of claim 12, wherein the operations further comprise:

receiving, by the data storage system, the first data from a remote system.

14. The non-transitory computer-readable storage medium of claim 13, wherein the remote system is configured to provide primary storage and the data storage system is configured to provide backup storage for the remote primary storage system.

15. The non-transitory computer-readable storage medium of claim 12, wherein the operations further comprise:

determining that a third segment of the first data does not update the second data by matching a second fingerprint associated with the third segment of the first data to a third fingerprint included in the second plurality of fingerprints; and removing the third segment of the first data from the data storage system in response to the determination.

16. The non-transitory computer-readable storage medium of claim 15, wherein the operations further comprise:

loading, into the cache memory, a third plurality of fingerprints that is associated with third data stored in the persistent storage, wherein the third data is not loaded into the cache memory;

determining that the third segment of the first data does not update the third data by comparing the second fingerprint to a fourth fingerprint of the third plurality of fingerprints; and removing the second segment from the data storage system in response to the determination.

17. The non-transitory computer-readable storage medium of claim 16, wherein a size of the third plurality of fingerprints is configurable.

18. The non-transitory computer-readable storage medium of claim 16, wherein the second data and the third data are included in an image stored in the persistent storage.

19. The non-transitory computer-readable storage medium of claim 18, wherein the second and third pluralities of fingerprints are part of a segment tree associated with the image.

20. The non-transitory computer-readable storage medium of claim 12, wherein a respective fingerprint of the first plurality of fingerprints is generated by inputting a respective segment into a cryptographic hash function.

21. The non-transitory computer-readable storage medium of claim 20, wherein the cryptographic hash function is one of a Secure Hash Algorithm (SHA) function and a Message-Digest 5 (MD5) function.

22. A data storage system, comprising:

a persistent storage device having stored therein a plurality of data segments and a plurality of fingerprints, wherein each stored data segment is associated with a respective fingerprint;

a processor;

a memory coupled to the processor for storing instructions, which executed by the processor, cause the processor to perform operations, the operations including selecting and loading a set of fingerprints from a segment tree representing a prior version of the file from the persistent storage device into a cache memory of the data storage system, wherein the set of fingerprints are associated with a first set of data segments that are stored in the persistent storage device and are to be updated by fresh data that is not stored in the persistent storage device, wherein the fresh data includes a first block of data of a file that has been changed from the prior version of the file, and wherein the selected set of fingerprints represents a second block of data of the prior version of the file corresponding to the first block of data, wherein the fresh data is associated with a client application, and wherein the set of fingerprints is identified based on an identifier of the client application;

dividing the fresh data into a plurality of fresh data segments;

creating a respective fresh fingerprint for each fresh data segment;

determining whether a first fresh fingerprint matches one of the selected set of fingerprints that is loaded into the cache memory;

replacing a first data segment in the first set of data segments with a first fresh data segment corresponding to the first fresh fingerprint in response to a determination by the comparison module that the first fresh fingerprint does not match any of the selected set of fingerprints loaded into the cache memory, including modifying a segment reference of the segment tree representing the prior version of the file to reference the first fresh data segment; and removing the first fresh data segment corresponding to the first fresh fingerprint from the data storage system in response to a determination by the comparison module that the first fresh fingerprint matches at least one of the selected set of fingerprints, including deleting the first fresh data segment and the first fresh fingerprint.

23. The data storage system of claim 22, wherein the operations further comprise identifying the first data segment included in the first set of data segments that corresponds to the first fresh data segment.

24. The data storage system of claim 23, wherein the operations further comprise storing the first fresh data segment in the persistent storage device as part of the first set of data segments.

25. The data storage system of claim 22, wherein the operations further comprise receiving the fresh data from a remote system.

26. The data storage system of claim 25, wherein the remote system is a system configured to provide primary storage and the data storage system is a server configured to provide backup storage for the primary storage system.

27. The data storage system of claim 22, wherein the operations further comprise determining that a second fresh data segment does not update the first set of data segments by matching a second fresh fingerprint associated with the second fresh data segment to a respective one of the set of fingerprints loaded into the cache memory from the persistent storage device, and removing the second fresh data segment from the data storage system in response to the determination.

* * * * *